UNITED STATES PATENT OFFICE.

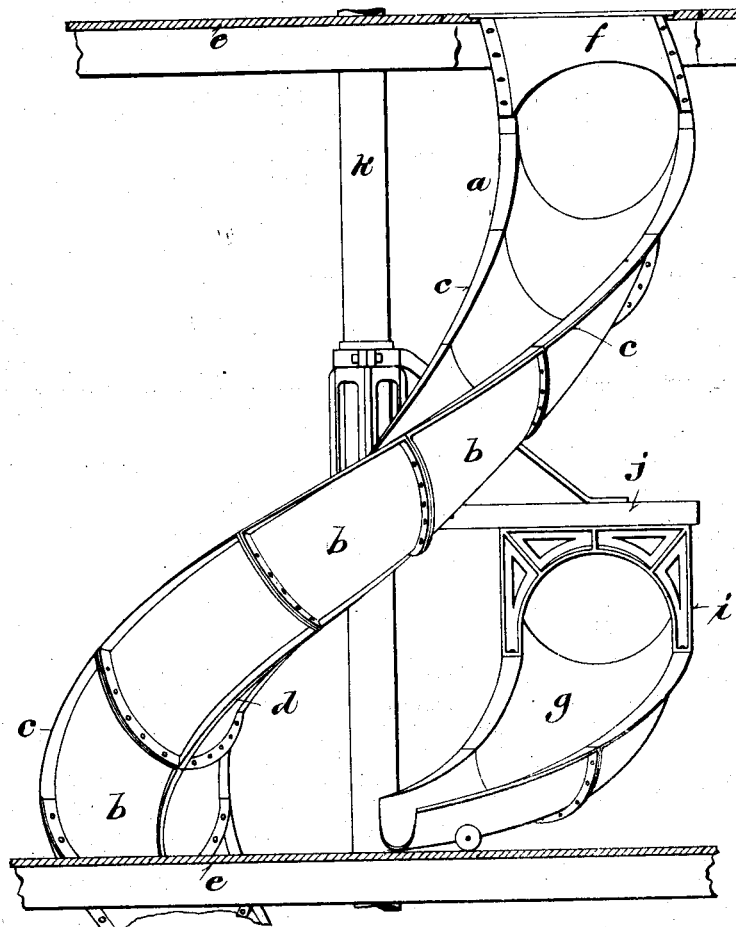

WILLIAM D. GRAY, OF MILWAUKEE, WISCONSIN.

SPIRAL CHUTE.

No. 834,720. Specification of Letters Patent. Patented Oct. 30, 1906.

Application filed December 28, 1905. Serial No. 293,573.

*To all whom it may concern:*

Be it known that I, WILLIAM D. GRAY, a citizen of the United States, residing at Milwaukee, in the county of Milwaukee and State of Wisconsin, have invented certain new and useful Improvements in Spiral Chutes, of which the following is a specification, reference being had to the accompanying drawing, forming a part thereof.

This invention relates to conduits for conveying articles or materials of various kinds from a higher to a lower floor of a building. Its main objects are to economize space, to provide for and facilitate discharging articles or material from the chute at any desired floor or level without making an opening or break in the chute, and generally to simplify and improve the construction and operation of devices of this class.

It consists in certain novel features of construction and in the peculiar arrangement and combinations of parts, as hereinafter particularly described, and defined in the claims.

The accompanying drawing shows in elevation a chute embodying the invention, parts being broken away.

The chute $a$, which is made in the form of an open spiral and preferably semicircular in cross-section, may be conveniently constructed in sections $b$, of cast or heavy sheet metal, flanged and bolted or riveted together at the ends, as shown. To stiffen and strengthen the structure, so that it will be self-supporting between floors, the sections are preferably formed with marginal flanges $c$ and may be formed with one or more intermediate longitudinal flanges $d$. Being thus made self-supporting and of a form to retain therein the articles or materials to be conveyed, no inclosing casing or other supporting framework or structure is required, and the space comprehended within the radius of the spiral described by the chute is left clear and available for use.

Openings are made in the several floors $e$, through which the chute passes, and in these openings are fitted hoods or hoppers $f$, which are preferably flanged and bolted or riveted at the sides to the marginal flanges $c$ of the chute. The upper edges of these hoppers are also preferably formed with outturned flanges, which are sunk into the floors flush with their upper surfaces.

For discharging material or articles conveyed by the chute on any floor through which it passes or at any other desired point therein turnout-switches $g$ are provided. These switches, which are preferably shaped in cross-section and curved lengthwise to conform with the shape and spiral curvature of the chute, may be conveniently constructed, like the chute, of cast or sheet metal stiffened and strengthened by marginal flanges. They are fitted at their upper ends into the chute and are movable into and out of place therein. When a switch is moved into operative position in the chute, as shown by the lower part of the drawing, it extends at its lower end over the hopper $f$ and bridges the opening through it into the chute, so that any article or material conducted from an upper floor by the chute will be discharged therefrom upon the floor where the switch is thus placed in operative position.

To facilitate handling the switches and moving them into and out of operative position, they are provided near their lower ends with rollers $h$, which run upon the floors $e$, and at their upper ends they are suspended by yokes $i$ from swinging arms $j$, which are pivoted or hinged upon a central vertical column or post $k$.

When a switch is not needed in service on any floor, it is swung away from the chute, as shown by the upper part of the drawing, and it may be carried under the chute, so that it will take up very little room and not be in the way.

The openings in the floors through which the chute passes and the hoods or hoppers $f$ inserted therein afford convenient means for loading or introducing and guiding material into the chute from the upper and intermediate floors, while the turnout-switches $g$ afford means for diverting the material from the chute and discharging it upon any of the lower floors.

The spiral form of the chute retards the descent of heavy articles therein sufficiently to prevent injury thereto, and the curvature of the spiral may be varied to secure this result with various kinds of materials or articles which it is designed to convey.

Various changes in the details of construction of the device may be made within the principle and intended scope of the invention.

claim—

1. An open spiral chute connecting a number of floors and composed of metal sections flanged and secured together at the ends and formed with marginal side flanges whereby the structure is stiffened and made self-supporting between floors, substantially as described.

2. The combination of a spiral chute connecting a number of floors and having openings into it at the upper floor-levels, and a discharge-switch or turnout movable into place to bridge the opening at each intermediate floor and to discharge material from the chute upon that floor, substantially as described.

3. The combination of an open spiral chute connecting a number of floors and a flanged hopper supported by the floor with the top approximately flush therewith and leading downwardly through the floor into the chute to which it is attached, substantially as described.

4. The combination of a spiral chute connecting a number of floors, and a switch adapted to be moved into and out of the chute at any desired point therein to discharge material or articles therefrom at that point, substantially as described.

5. The combination of a continuous open spiral chute connecting a number of floors, openings being made into it through the upper and intermediate floors, and a discharge-switch movable into and out of the chute over a floor-opening and conforming to the shape of the chute, substantially as described.

6. The combination of a continuous open spiral chute connecting a number of floors, a vertical central column, and a turnout-switch fitting into the chute and suspended from a swinging arm pivoted on said column, substantially as described.

In witness whereof I hereto affix my signature in presence of two witnesses.

WILLIAM D. GRAY.

Witnesses:
 CHAS. L. GOSS,
 BERNARD C. ROLOFF.